US008423967B2

(12) United States Patent
Holden et al.

(10) Patent No.: US 8,423,967 B2
(45) Date of Patent: Apr. 16, 2013

(54) AUTOMATED LEVEL-BASED TARGETED TEST CONFIGURATION

(75) Inventors: Ian G. Holden, Salisbury (GB); Mark R. Hufnagel, Corning, NY (US); Michael T. Peters, Morrisville, NC (US); Jonathan S. Tilt, Romsey (GB); Michael J. Triantafelow, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/496,480

(22) Filed: Jul. 1, 2009

(65) Prior Publication Data

US 2011/0004867 A1 Jan. 6, 2011

(51) Int. Cl.
 *G06F 9/44* (2006.01)
 *G06F 9/45* (2006.01)

(52) U.S. Cl.
 USPC ............................ 717/127; 717/125; 717/126

(58) Field of Classification Search .......... 717/124–131; 709/203–204
 See application file for complete search history.

(56) References Cited

U.S. PATENT DOCUMENTS

| | | | | |
|---|---|---|---|---|
| 6,223,337 | B1 * | 4/2001 | Blume ........................... | 717/126 |
| 6,269,478 | B1 * | 7/2001 | Lautenbach-Lampe et al. ............................... | 717/127 |
| 6,708,327 | B1 * | 3/2004 | Aliphas ......................... | 717/125 |
| 6,925,634 | B2 * | 8/2005 | Hunter et al. ................. | 717/124 |
| 6,941,545 | B1 * | 9/2005 | Reese et al. ................... | 717/130 |
| 6,954,923 | B1 * | 10/2005 | Yates et al. .................... | 717/130 |
| 6,959,320 | B2 * | 10/2005 | Shah et al. ..................... | 709/203 |
| 7,013,456 | B1 * | 3/2006 | Van Dyke et al. ............ | 717/130 |
| 7,185,319 | B2 * | 2/2007 | Kaler et al. .................... | 717/124 |
| 7,353,498 | B2 * | 4/2008 | Gupta et al. ................... | 717/125 |
| 7,644,393 | B2 * | 1/2010 | Glerum et al. ................ | 717/127 |
| 7,661,094 | B2 * | 2/2010 | Blevin et al. .................. | 717/130 |
| 7,716,648 | B2 * | 5/2010 | Vaidyanathan et al. ...... | 717/128 |
| 7,823,135 | B2 * | 10/2010 | Horning et al. ............... | 717/127 |
| 7,849,448 | B2 * | 12/2010 | Yunus et al. ................... | 717/126 |
| 7,870,535 | B2 * | 1/2011 | Rippert et al. ................ | 717/100 |
| 7,917,894 | B2 * | 3/2011 | Chen et al. .................... | 717/124 |
| 7,954,090 | B1 * | 5/2011 | Qureshi et al. ................ | 717/127 |
| 8,056,060 | B2 * | 11/2011 | Bicheno et al. ............... | 717/127 |
| 8,291,387 | B2 * | 10/2012 | Pal et al. ....................... | 717/126 |

OTHER PUBLICATIONS

Bubevski. "An application of six sigma and simulation in software testing and risk assessment", IEEE, pp. 295-302, 2010.*
Kasurinen et al, Test case selection and priortization: Risk based or design based? ACM ESEM, pp. 1-10, 2010.*
Taipale et al, "Improving software testing by observing practice", ACM ISESE, pp. 262-271,, 2006.*

(Continued)

*Primary Examiner* — Anil Khatri
(74) *Attorney, Agent, or Firm* — Lee Law, PLLC; Christopher B. Lee

(57) ABSTRACT

An indication of a change to at least one source file associated with a software build is received via a processor. A set of test levels of a level-based testing suite are sequentially processed, where each test level subsequently processed includes tests with decreasing qualitative testing information relative to tests associated with previously-processed test levels. For each processed test level, at least one test is selected that tests the change to the at least one source file associated with the software build, test coverage relative to a target risk level for the software build is determined for each selected test, and test selection is terminated upon determining that the test coverage for the selected tests at least meets the target risk level for the software build.

13 Claims, 5 Drawing Sheets

OTHER PUBLICATIONS

Chen et al, "Specification based regression test selection with risk analysis", ACM CASCON, pp. 1-14, 2002.*

United States Patent and Trademark Office, Office Action for U.S. Appl. No. 13/434,748, Jul. 23, 2012, pp. 1-20, Alexandria, VA, USA.

* cited by examiner

AUTOMATED LEVEL-BASED TARGETED TEST CONFIGURATION

BACKGROUND

The present invention relates to systems and methods for configuring tests for software builds. More particularly, the present invention relates to level-based targeted test configuration.

Developers of software typically use a programming language to create individual source files. The source files are each designed to perform certain functionality for a larger software build. The source files are compiled or otherwise integrated to form components. The components are integrated to form the complete software build.

The developers or separate test developers also create individual tests for testing the source files or portions of the source files associated with the software build. The individual tests are integrated to form test suites for testing either individual source files or components within the software build. The software builds are tested using the test suites within a testing environment. As source files are added or changed, they are added to or updated within the software build. Tests are added or changed and integrated into the testing environment to test the added or changed source files.

SUMMARY

A method includes receiving, via a processor, an indication of a change to at least one source file associated with a software build; sequentially processing a plurality of test levels of a level-based testing suite, where each test level subsequently processed comprises tests with decreasing qualitative testing information relative to tests associated with previously-processed test levels, and further comprising: for each processed test level: selecting at least one test that tests the change to the at least one source file associated with the software build; determining test coverage relative to a target risk level for the software build for each selected test; and terminating test selection upon determining that the test coverage for the selected tests at least meets the target risk level for the software build.

A system includes a memory that stores a level-based testing suite for testing a software build; and a processor programmed to: receive an indication of a change to at least one source file associated with the software build; sequentially process a plurality of test levels of the level-based testing suite, where each test level subsequently processed comprises tests with decreasing qualitative testing information relative to tests associated with previously-processed test levels; and where the processor is further programmed, for each processed test level, to: select at least one test that tests the change to the at least one source file associated with the software build; determine test coverage relative to a target risk level for the software build for each selected test; and terminate test selection upon determining that the test coverage for the selected tests at least meets the target risk level for the software build.

An alternative system includes a memory that stores a level-based testing suite for testing a software build; and a processor programmed to: receive an indication of a change to at least one source file associated with the software build; sequentially process a plurality of test levels of the level-based testing suite, where each test level subsequently processed comprises tests with decreasing qualitative testing information relative to tests associated with previously-processed test levels; for each processed test level, to: select at least one test that tests the change to the at least one source file associated with the software build; determine test coverage relative to a target risk level for the software build for each selected test; and terminate test selection upon determining that the test coverage for the selected tests at least meets the target risk level for the software build; and upon termination of test selection, to: configure a test for the software build to test the change to the at least one source file associated with the software build based upon the tests selected from a plurality of tests for each processed test level; and initiate testing of the software build via an automated testing framework.

A computer program product includes a computer readable storage medium including a computer readable program, where the computer readable program when executed on a computer causes the computer to: receive an indication of a change to at least one source file associated with the software build; sequentially process a plurality of test levels of the level-based testing suite, where each test level subsequently processed comprises tests with decreasing qualitative testing information relative to tests associated with previously-processed test levels; and where the computer readable program when executed on the computer further causes the computer, for each processed test level, to: select at least one test that tests the change to the at least one source file associated with the software build; determine test coverage relative to a target risk level for the software build for each selected test; and terminate test selection upon determining that the test coverage for the selected tests at least meets the target risk level for the software build.

DETAILED DESCRIPTION

Figure 1:
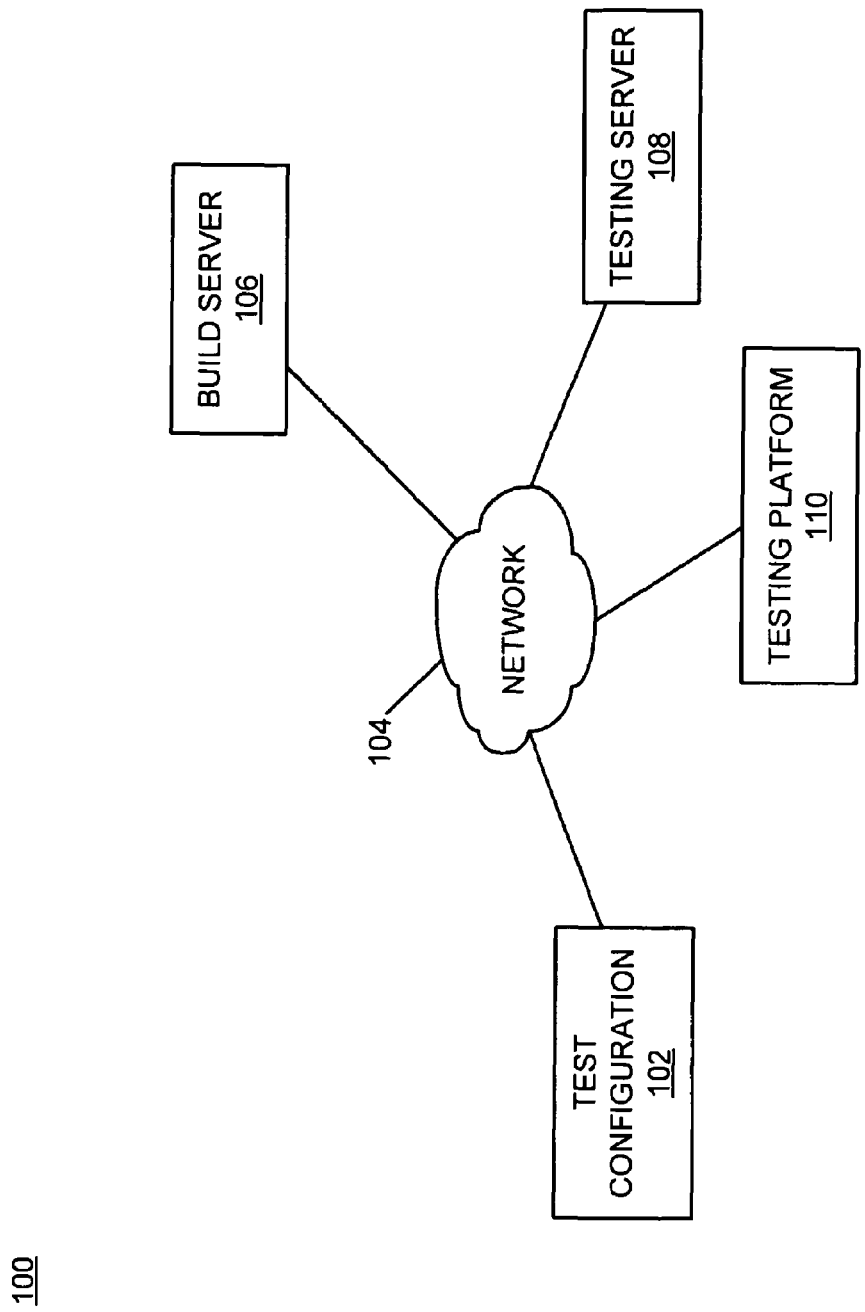
FIG. 1 is a block diagram of an example of an implementation of a system for automated level-based targeted test configuration according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides level-based targeted test configuration. Tests are assigned to different levels based upon availability and type of test coverage information. Tests are automatically selected for testing changes to source files in a software build by repeatedly evaluating selected tests against a configured target risk level for the software build until a configured target risk level is achieved. Tests for the changed source files are initially selected from a first (e.g., highest) level that includes highly-granular tests having automated test coverage information. If the target risk level has not been met, additional tests are selected from a second level that includes tests having associated developer-created test information including configured rules with static mappings to tested source files. If the target risk level has not been met, additional tests are selected from a third level that includes tests having associated persistent data that maps test suites to the components they test. If the target risk level has not been met, tests are selected from a fourth level that includes tests with no targeted test information.

As new tests are created or as new and better quality test coverage information (e.g., automated test coverage information) is created for existing tests, the tests are promoted to higher levels within the level-based targeted test environment. As such, developers may integrate tests into the environment at a lower level with minimal or with no test coverage information to expedite integration of these tests. Later, upon refining the tests to include improved test coverage information and/or upon increasing granularity for the tests, the tests may be promoted to higher levels within the level-based targeted test environment. Accordingly, tests may be modified over time to both increase granularity and automation and may be integrated into an appropriate level within the level-based targeted test environment. Tests that are promoted to the highest level automatically test changes to source files in a targeted and highly-granular fashion using automated test coverage information to determine the associated risk with the changes to the source files. The automated test coverage information may be generated by any available test coverage information generation utility. Changes to source files may be determined by any available code crawling utility to automate input for level-based targeted test configuration.

Tests may be automatically selected in response to an indication of a change to a software build. A determination is made as to whether fully-automated targeted tests are available within the highest level to achieve a configured software build impact reduction for the change based upon the associated test coverage information. If the configured target risk level (e.g., the software build impact reduction) is not achieved with tests in the first level, tests are selected from increasingly lower levels until the configured software build impact reduction is achieved.

The level-based targeted test configuration environment provides for increasing granularity, information availability, integration, and automation for tests within a testing environment over time. Existing tests may be ported to the environment within the fourth level and promoted to higher levels as increased targeted test information is generated and associated with the respective tests.

Target risk levels may be configured based upon goals for the software build. Additionally, an impact of changes to source files within the software build may be measured and considered based upon the configured target risk level for the software build. An impact reduction may be measured based upon reductions to the impact of changes to source files relative to the target risk level. The target risk level, and as such, the impact reduction measurements, may be based upon development, deployment, reliability, and other objectives.

Each source file change may initially be assigned a 100% impact, such that there is assigned a 100% chance of error by integration of each respective changed source file. As such, an impact reduction to a configured target risk level, such as 10% (e.g., 90% test coverage/verification impact reduction), may be measured as tests are automatically selected for testing changes to each respective source file. The configured target risk level and the associated impact reduction for changes to source files in the software build may be configured differently for initial deployment and for subsequent updates of a software build.

Extended testing periods for software builds may be reduced by use of the level-based targeted test configuration described herein. Because tests are selected in a targeted fashion, extra testing of known-good source files and components may be minimized. Additionally, allowing integration of existing tests and improvement of automated test coverage information over time limits delay that would otherwise be associated with integration of tests into an automated environment. Accordingly, software build development and modification times may also be reduced by use of the level-based targeted test configuration described herein.

The level-based targeted test configuration described herein may be performed in real time to allow prompt configuration of level-based targeted test selection. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated level-based targeted test configuration. Within the system 100, a test configuration device 102 is shown interconnected via a network 104 to a build server 106, a testing server 108, and a testing platform module 110. As will be described in more detail below in association with FIG. 2 through FIG. 5, the test configuration device 102 provides automated level-based targeted test configuration based upon selection of available tests and available test coverage information. The selection of available tests may be further based upon a targeted risk level for a software build in view of the available test coverage information.

The build server 106 includes software build development tool execution capabilities, such as compilation, integration, and other functions associated with software build development. Developers may interconnect with the build server 106 via personal computers or other computing devices (not shown) to develop and integrate source files for a software build under development.

The testing server 108 includes an automated test framework that may be configured via test selection by the test configuration device 102 to execute a set of tests for the software build under development. The testing platform module 110 includes any system under test interfaces that may be associated with the software build under development, such as device interfaces for verification of testing. Feedback may be provided from the testing platform module 110 to the testing server 108 as tests are executed, and the results of tests may be provided to developers via any suitable feedback mechanism (e.g., reports, displayed output, etc.).

It should be noted that the test configuration device 102 may be any computing device capable of processing information as described above and in more detail below. For example, the test configuration device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 includes any form of interconnection suitable for the intended purpose, including a private or public network such as an intranet or the Internet, respectively, direct inter-module interconnection, dial-up, wireless, or any other interconnection mechanism capable of interconnecting the devices within the system 100.

Figure 2:
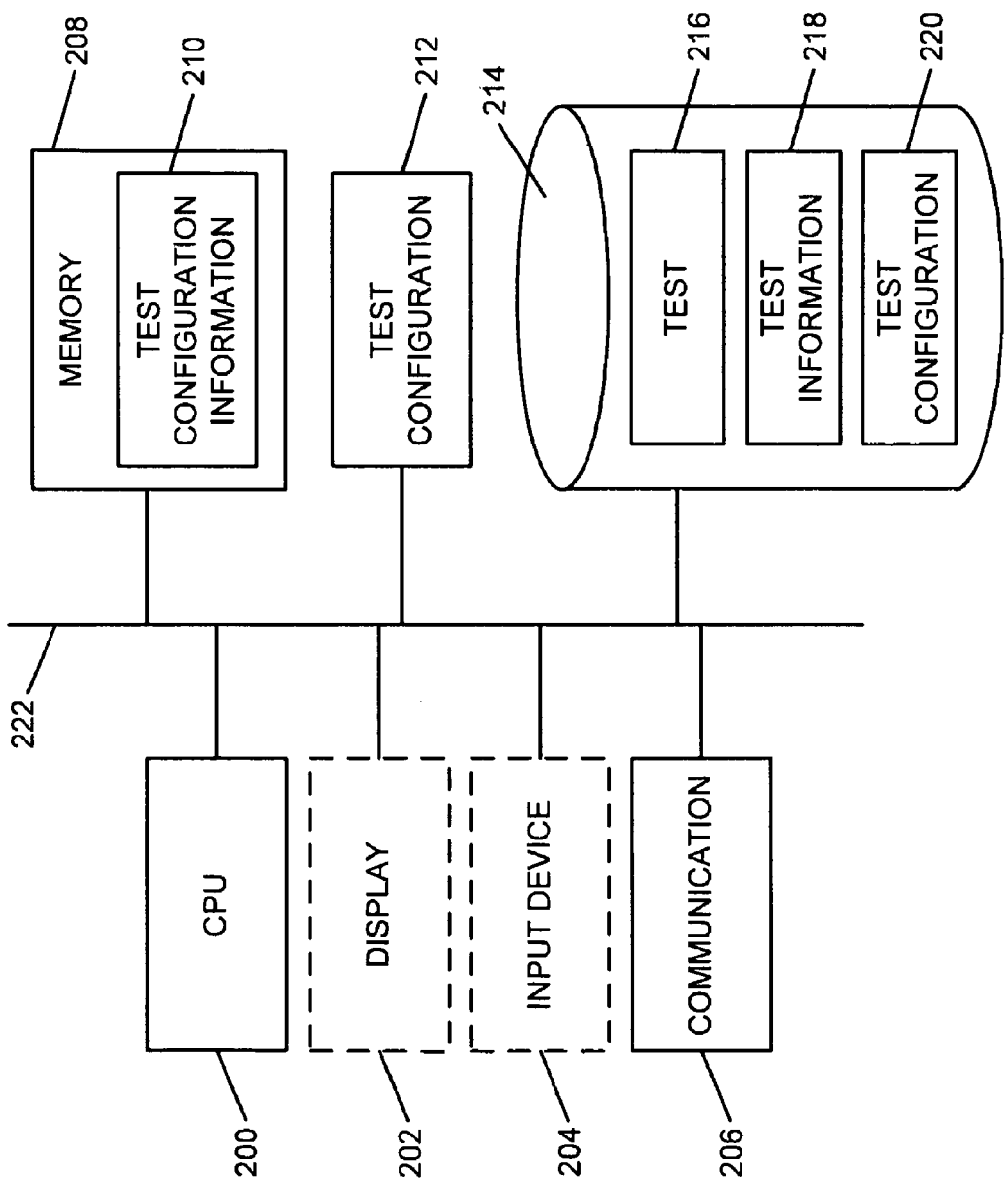
FIG. 2 is a block diagram of an example of an implementation of the test configuration device that is capable of performing automated level-based targeted test configuration according to an embodiment of the present subject matter.

FIG. 2 is a block diagram of an example of an implementation of the test configuration device 102 that is capable of performing automated level-based targeted test configuration. A central processing unit (CPU) 200 provides computer instruction execution, computation, and other capabilities within the test configuration device 102. A display 202 provides visual information to a user of the test configuration device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the test configuration device 102 for certain implementations. Accordingly, the test configuration device 102 may operate as a completely automated embedded device without user configurability or feedback. However, the test configuration device 102 may also provide user feedback and configurability via the display 202 and the input device 204, respectively.

A communication module 206 provides interconnection capabilities that allow the test configuration device 102 to communicate with other modules within the system 100, such as the build server 106, the testing server 108, and the testing platform module 110. The communication module 206 may include any electrical, protocol, and protocol conversion capabilities useable to provide the interconnection capabilities.

A memory 208 includes a test configuration information storage area 210 that stores information useable by the test configuration device 102 for automated level-based targeted test configuration. As will be described in more detail below, information stored within the test configuration information storage area 210 is used to expedite test selection and processing among the different levels of the level-based targeted test configuration environment.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A level-based targeted test configuration module (test configuration module) 212 is also illustrated. The test configuration module 212 provides automated test selection from multiple test levels based upon available test coverage information relative to configured target risk levels for a given software build.

Though the test configuration module 212 and the communication module 206 are illustrated as a component-level modules for ease of illustration and description purposes, it should be noted that the test configuration module 212 and the communication module 206 may include any hardware, programmed processor(s), and memory used to carry out the functions of the respective device as described above and in more detail below. For example, the test configuration module 212 and the communication module 206 may include additional controller circuitry in the form of application specific integrated circuits (ASICs), processors, antennas, and/or discrete integrated circuits and components for performing communication and electrical control activities associated with the respective device. Additionally, the test configuration module 212 and the communication module 206 may include interrupt-level, stack-level, and application-level modules as appropriate. Furthermore, the test configuration module 212 and the communication module 206 may include any memory components used for storage, execution, and data processing for performing processing activities associated with the respective device. The test configuration module 212 and the communication module 206 may also form a portion of other circuitry described without departure from the scope of the present subject matter.

It should also be noted that the test configuration module 212 may alternatively be implemented as an application stored and executed from within the memory 208. In such an implementation, the test configuration module 212 may include instructions executable by the CPU 200 for performing the functionality described herein. The CPU 200 may execute these instructions to provide the processing capabilities described above and in more detail below for the test configuration device 102. The test configuration module 212 may form a portion of an interrupt service routine (ISR), a portion of an operating system, a portion of a browser application, or a portion of a separate application without departure from the scope of the present subject matter.

A database 214 is associated with the test configuration device 102 and provides storage capabilities for information associated with the automated level-based test configuration of the test configuration device 102. The database 214 includes a test storage area 216, a test information storage area 218, and a test configuration storage area 220 that may be stored in the form of tables or other arrangements accessible by the test configuration device 102. The test storage area 216 includes tests that may be selected by the test configuration module 212 for testing of software builds. The test information storage area 218 includes information associated with the tests stored in the test storage area 216, such as assigned test levels for tests and test coverage information. As described above, test coverage information may include automated test coverage information for tests in the first (highest) test level, configured rules with static mappings to tested source files for tests in the second test level, persistent data that maps test suites to the components they test for tests in the third test level, or indications of no targeted test information for tests in the fourth level. The test configuration module 212 utilizes the test level and test coverage information to prioritize selection of tests for the software build based upon the assigned level and availability of test coverage information. The test configuration storage area 220 includes storage for configured tests useable by the testing server 108 to execute tests against a software build.

The CPU 200, the display 202, the input device 204, the communication module 206, the memory 208, the test configuration module 212, and the database 214 are interconnected via an interconnection 222. The interconnection 222 may include a system bus, a network, or any other interconnection capable of providing the respective components with suitable interconnection for the respective purpose.

While the test configuration device 102 is illustrated with and has certain components described, other modules and components may be associated with the test configuration device 102 without departure from the scope of the present subject matter. Additionally, it should be noted that, while the test configuration device 102 is described as a single device for ease of illustration purposes, the components within the test configuration device 102 may be co-located or distributed and interconnected via a network, such as the network 104, without departure from the scope of the present subject matter. For a distributed arrangement, the display 202 and the input device 204 may be located at a kiosk or other location, while the CPU 200 and memory 208 may be located at a local or remote server. Many other possible arrangements for components of the test configuration device 102 are possible and all are considered within the scope of the present subject matter. It should also be understood that, though the test storage area 216, the test information storage area 218, and the test configuration storage area 220 are shown within the database 214, they may also be stored within the memory 208 without departure from the scope of the present subject matter. Accordingly, the test configuration device 102 may take many forms and may be associated with many platforms.

Figure 3:
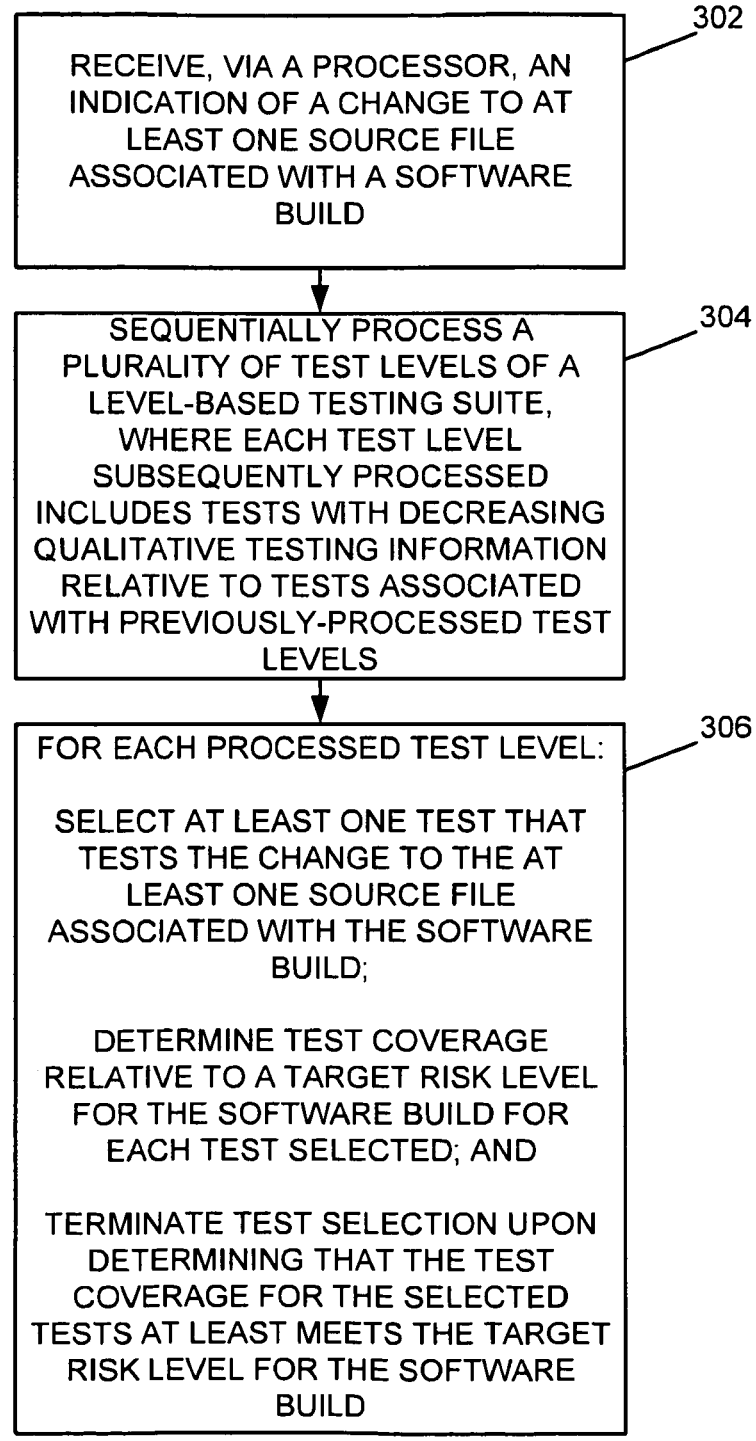
FIG. 3 is a flow chart of an example of an implementation of a process for automated level-based targeted test configuration according to an embodiment of the present subject matter.
Figure 4:
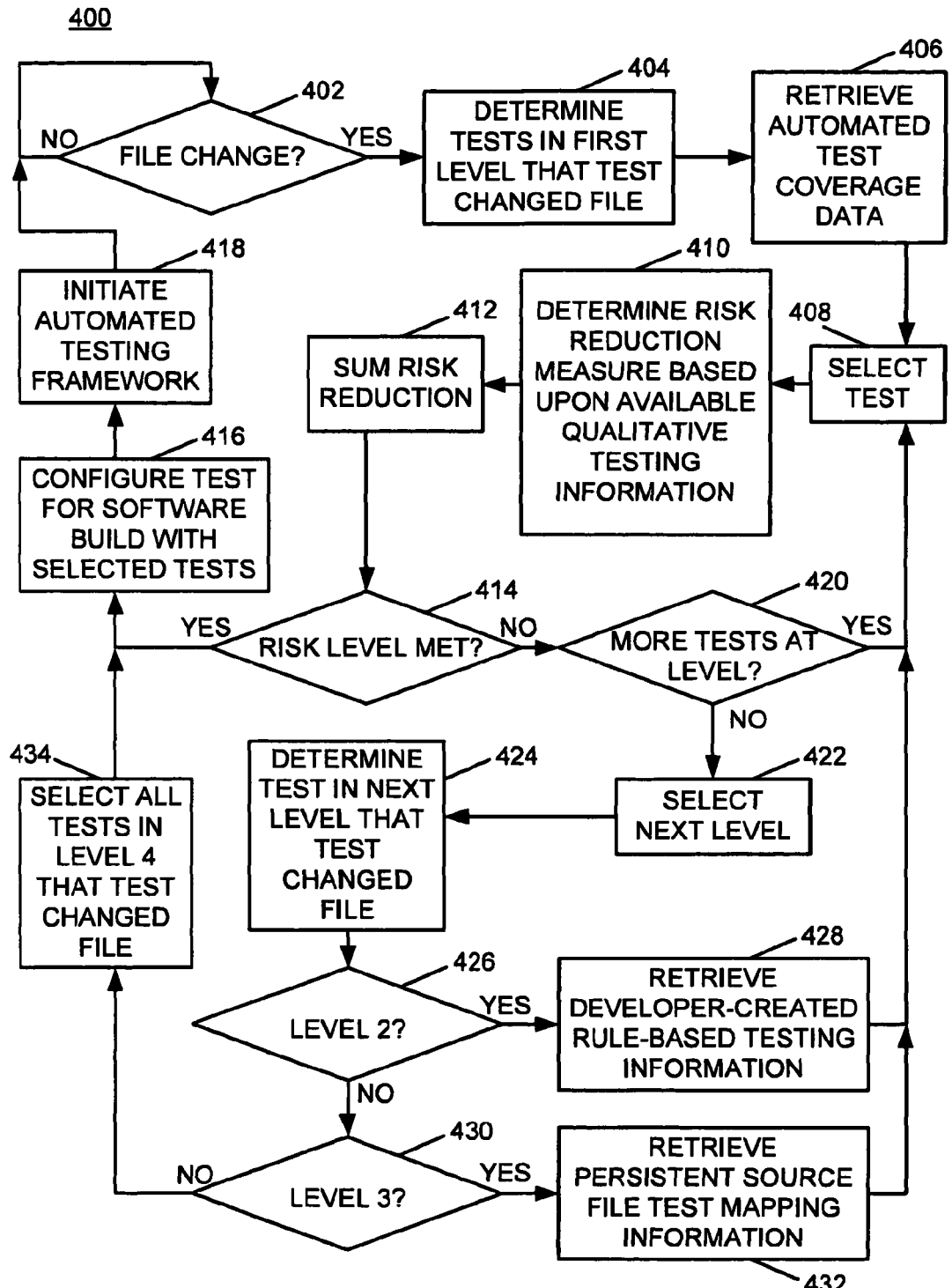
FIG. 4 is a flow chart of an example of an implementation of a process for test selection from different levels in association with automated level-based targeted test configuration based upon available test coverage information according to an embodiment of the present subject matter.
Figure 5:
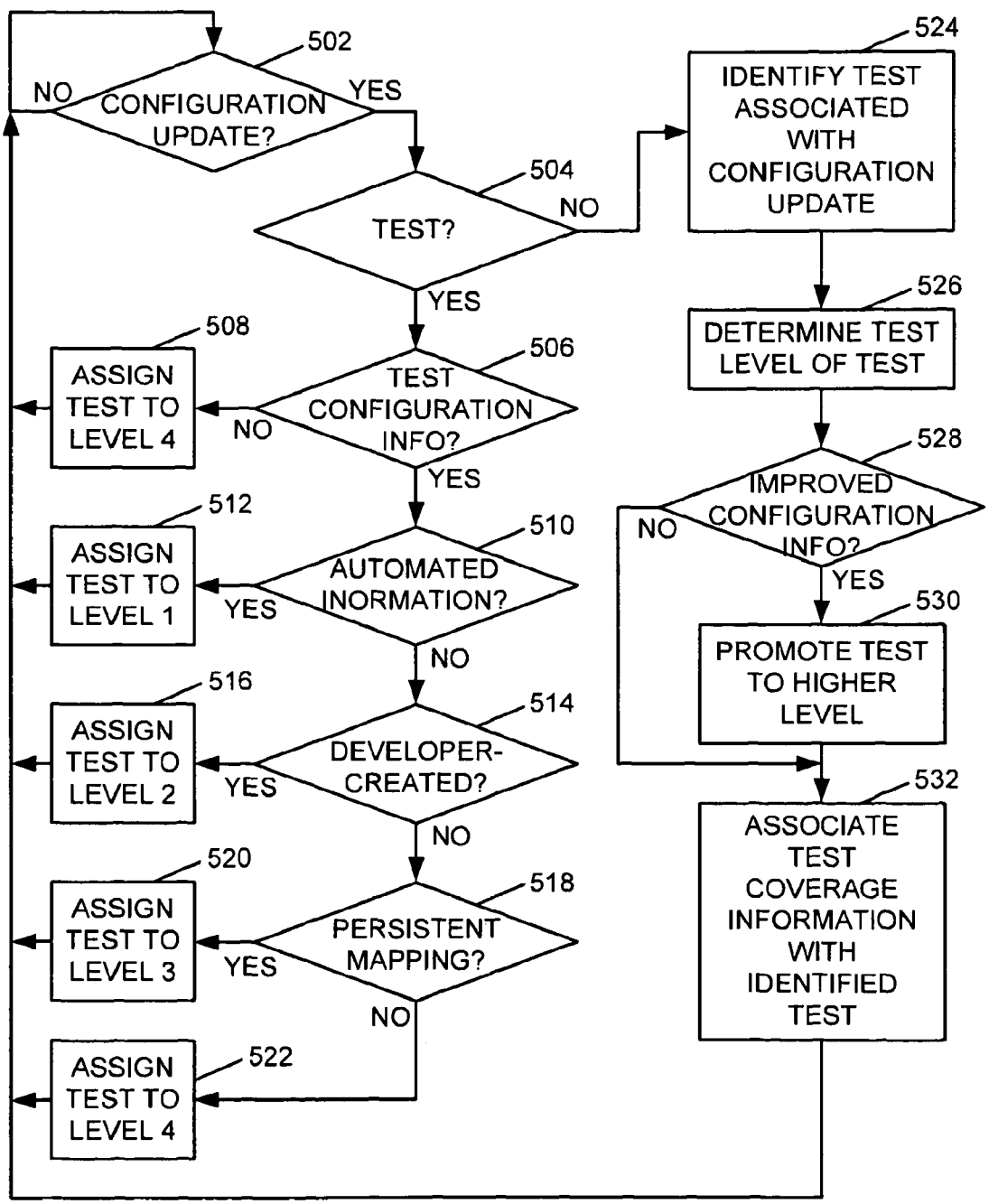
FIG. 5 is a flow chart of an example of an implementation of a process for test suite configuration that assigns tests to different levels of a level-based test configuration environment and that promotes tests to higher levels based upon available test coverage information according to an embodiment of the present subject matter.

FIG. 3 through FIG. 5 below describe example processes that may be executed by level-based targeted test configuration devices, such as the test configuration 102, to perform the automated level-based targeted test configuration associated with the present subject matter. Many other variations on the example processes are possible and all are considered within the scope of the present subject matter. The example processes may be performed by modules, such as the test configuration module 212 and/or executed by the CPU 200, associated with level-based targeted test configuration devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated level-based targeted test configuration. At block 302, the process 300 receives, via a processor, an indication of a change to at least one source file associated with a software build. At block 304, the process 300 sequentially processes a plurality of test levels of a level-based testing suite, where each test level subsequently processed includes tests with decreasing qualitative testing information relative to tests associated with previously-processed test levels. At block 306, the process 300, for each processed test level, selects at least one test that tests the change to the at least one source file associated with the software build; determines test coverage relative to a target risk level for the software build for each selected test; and terminates test selection upon determining that the test coverage for the selected tests at least meets the target risk level for the software build.

FIG. 4 is a flow chart of an example of an implementation of a process 400 for test selection from different levels in association with automated level-based targeted test configuration based upon available test coverage information. At decision point 402, the process 400 determines whether a change to a source file associated with a software build has occurred. This determination may be made in response to receipt of an indication of a change to at least one source file associated with a software build or may be performed by the process 400. Receipt of such an indication may include receipt of a source file change list from a code crawling application. Many other possibilities exist for determining whether a change to a source file associated with a software build has occurred, and all are considered within the scope of the present subject matter. For ease of illustration purposes, the process 400 is illustrated in association with a change to one source file. However, it is understood that the processing illustrated and described below may be performed for each source file that has changed. Additionally, certain tests may overlap in test coverage and this overlap may further be considered in association with the level-based targeted test configuration described without departure from the scope of the present subject matter.

When a determination is made at decision point 402 that a change to a source file associated with a software build has occurred, the process 400 begins to sequentially process a set of test levels of a level-based testing suite, where each test level subsequently processed includes tests with decreasing qualitative testing information relative to tests associated with previously-processed test levels. At block 404, the process 400 determines tests in the first (e.g., highest) level of the level-based testing suite that test the changed source file. This determination may be made by identifying tests within the test storage area 216 that have test association information stored within the test information storage area 218 of the database 214.

As described above, tests within the first three levels of the level-based test configuration environment have some form of qualitative testing information. The qualitative testing information may be stored within the test information storage area 218 of the database 214. Tests assigned to the first test level have associated automated test coverage data created by any suitable test coverage data generation tool. As such, at block 406, the process 400 retrieves the associated automated test coverage data, such as from the test information storage area 218 of the database 214, for any tests that have been identified that test the changed source file.

At block 408, the process 400 selects a first test of the identified tests that test the source file. At block 410, the process 400 determines a risk reduction measure (e.g., percentage) based upon the available qualitative testing information for the selected test. As described above, tests within the first level have automated test coverage data associated with them. The automated test coverage data may include percentage-based or other calculated/measured test coverage information that identifies the portion of the respective source file that is tested, and may also provide a qualitative measure of the testing performed by the selected test. As such, for selected tests from the first test level, the process 400 determines a test coverage risk reduction percentage/measure associated with the automated test coverage data for each test selected from the first test level. At block 412, the process 400 sums the risk reduction for the selected test with other selected tests previously processed. For the first test selected, the summation equals the risk reduction for the selected test.

At decision point 414, the process 400 makes a determination as to whether the target risk level has been met for the software build. A description of iterative processing for additional tests at the same or at lower levels will be presented below in favor of a brief description of final higher-level processing associated with the process 400. When a determination is made that the target risk level has been met for the software build, at block 416 the process 400 configures a test for the software build to test the changed portion of the at least one source file associated with the software build based upon the tests selected from the set of tests for each processed test level. At block 418, the process initiates testing of the software build via an automated testing framework.

Returning to the description of the iterative processing for additional tests at the same or at lower levels, when a determination is made at decision point 414 that the summed test coverage risk reduction percentage does not at least meet the target risk level for the software build, the process 400 makes a determination at decision point 420 as to whether there are any more tests at the present test selection level that test the changed source file. When a determination is made that there are more tests at the present test selection level that test the changed source file, the process 400 returns to block 408 to select the next test and continues processing as described above.

When a determination is made at decision point 420 that there are no more tests at the present test selection level that test the changed source file, the process 400 initiates selection of tests from the second or lower of the set of available test levels. At block 422, the process 400 selects the next lower test level (e.g., the second level if the present level is the first level, etc.). At block 424, the process 400 determines tests in the next test level that test the changed source file. At decision point 426, the process 400 makes a determination as to whether the current test level is the second test level. When a determination is made that the current test level is the second test level, at block 428 the process 400 retrieves developer-created test information that identifies conditional selection criteria for tests based upon identified source files that are changed within the software build. The process 400 continues to block 408 to iterate as described above to select and process tests within the second test level. For tests assigned to the second test level, selection of tests from the second test level may be based upon satisfaction of the conditional selection criteria that identifies the source file associated with the developer-created test information.

Returning to the description of decision point 426, when a determination is made that the current test level is not the second test level (e.g., the third or fourth test level), the process 400 makes a determination at decision point 430 as to whether the current test level is the third test level. When a determination is made that the current test level is the third test level, at block 432 the process 400 retrieves associated persistent source file test mapping information that identifies conditional selection of tests based upon components that are changed within the software build. As described above, source files may be integrated to form components. As such, tests for testing components are selected at the third test level to achieve testing of the changes to the source file. The process 400 continues to block 408 to iterate as described above to select and process tests within the third test level. For tests assigned to the third test level, selection of tests from the third of the set of test levels may be based upon satisfaction of the conditional selection criteria that identifies the at least one source file associated with the persistent source file test mapping.

Returning to the description of decision point 430, when a determination is made that the current test level is not the third test level, at block 434 the process 400 selects all tests from the fourth of the set of test levels to complete test selection. The process 400 returns to block 416 to configure the test for the software build, initiates automated testing within an automated test framework at block 418, and returns to decision point 402 to await an indication of a change to another source file.

It should be noted that the process 400 may configure the test for the software build and initiate testing at any stage of test selection where the configured risk level for the software build is satisfied by the tests selected to that point in the processing. As such, the process 400 provides automated level-based targeted test configuration based upon available test coverage information for test assigned to multiple test levels. The highest test level includes automated test coverage information, and each lower level that is iteratively processed includes lower granularity of tests and decreasing qualitative testing information.

FIG. 5 is a flow chart of an example of an implementation of a process 500 for test suite configuration that assigns tests to different levels of a level-based test configuration environment and that promotes tests to higher levels based upon available test coverage information. The process 500 may be used to initially configure tests within the level-based test configuration environment or to promote tests to higher levels based upon increased and/or improved test coverage information. At decision point 502, the process 500 determines whether a test configuration update, such as a test or a test coverage information update, has been requested. When a determination is made that a test configuration update has been requested, the process 500 makes a determination at decision point 504 as to whether the request is a request to update a test within the level-based test configuration environment or whether the request is a request to update test coverage information for a test. Processing associated with a determination that the request is a request to update test coverage information will be described below after processing associated with a request to update a test.

As such, when a determination is made that the request is a request to update a test within the level-based test configuration environment, the process 500 makes a determination at decision point 506 as to whether any test configuration information is associated with the test. When a determination is made that there is no test configuration information associated with the test, the process 500 assigns the test to a fourth level (e.g., level 4) of the level-based test configuration environment at block 508 and the process 500 returns to decision point 502 to await a new request for a test configuration update.

When a determination is made at decision point 506 that test configuration information is associated with the test, the process 500 makes a determination at decision point 510 as to whether the test configuration information includes automated test coverage information. When a determination is made that the test configuration information includes automated test coverage information, the process 500 assigns the test to a first test level (e.g., level 1) of the level-based test configuration environment at block 512 and the process 500 returns to decision point 502 to await a new request for a test configuration update.

When a determination is made at decision point 510 that the test configuration information is not automated test coverage information, the process 500 makes a determination at decision point 514 as to whether the test configuration information includes associated developer-created test information. When a determination is made that the test configuration information includes associated developer-created test information, the process 500 assigns the test to a second test level (e.g., level 2) of the level-based test configuration environment at block 516 and the process 500 returns to decision point 502 to await a new request for a test configuration update.

When a determination is made at decision point 514 that the test configuration information is not developer-created test information, the process 500 makes a determination at decision point 518 as to whether the test configuration information includes associated persistent source file test mapping information. When a determination is made that the test configuration information includes associated persistent source file test mapping information, the process 500 assigns the test to a third test level (e.g., level 3) of the level-based test configuration environment at block 520 and the process 500 returns to decision point 502 to await a new request for a test configuration update. When the process 500 determines that the test configuration information is not persistent source file test mapping information, the process 500 performs a default operation and assigns the test to the fourth level (e.g., level 4) at block 522, similar to that performed at block 508 described above, and returns to decision point 502 to await a new request for a test configuration update.

Returning to the description of decision point 504, when a determination is made that the request is not a request to update a test within the level-based test configuration environment and is instead a request to update test coverage information for a test, the process 500 identifies the test associated with the updated test coverage information at block 524. At block 526, the process 500 determines a test level to which the test is assigned.

At decision point 528, the process 500 makes a determination as to whether the updated test coverage information is sufficiently improved to allow promotion of the test to a higher level within the level-based test configuration environment. When a determination is made that the test configuration information is sufficiently improved to allow promotion of the test to a higher level within the level-based test configuration environment, the process 500 promotes the test to a higher level at block 530. For example, if the test was previously assigned to the second level (e.g., level 2) and automated test coverage information is received, the test may be promoted to the first test level (e.g., level 1).

Upon completion of processing to promote the test to the higher test level at block 530 or upon making a determination that the test configuration information is not sufficiently improved to allow promotion of the test to a higher level within the level-based test configuration environment at decision point 528, the process 500 associates the received test coverage information with the identified test at block 532. The process 500 returns to decision point 502 to await a new request for a test configuration update.

As such, the process 500 provides for test suite configuration and assigns tests to different levels of a level-based test configuration environment based upon available test coverage information. The process 500 also promotes tests to higher levels within the level-based test configuration environment based upon receipt of improved test configuration information.

As described above in association with FIG. 1 through FIG. 5, the example systems and processes provide automated level-based test configuration. Many other variations and additional activities associated with level-based test configuration are possible and all are considered within the scope of the present subject matter.

Those skilled in the art will recognize, upon consideration of the above teachings, that certain of the above examples are based upon use of a programmed processor such as CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a memory that stores a level-based testing suite for testing a software build; and
a processor programmed to:
  receive an indication of a change to at least one source file associated with the software build;
  sequentially process a plurality of test levels of the level-based testing suite, where each test level subsequently processed comprises tests with decreasing qualitative testing information relative to tests associated with previously-processed test levels; and
  where the processor is further programmed, for each processed test level, to:
    select at least one test that tests the change to the at least one source file associated with the software build;
    determine test coverage relative to a target risk level for the software build for each selected test;
    determine a test coverage risk reduction measure associated with automated test coverage data for each test selected from a first of the plurality of test levels of the level-based testing suite sequentially processed; and
    terminate test selection upon determining that the test coverage for the selected tests at least meets the target risk level for the software build.

2. The system of claim 1, where:

the first of the plurality of test levels of the level-based testing suite sequentially processed by the processor comprises tests, each with the associated automated test coverage data; and a second of the plurality of test levels of the level-based testing suite sequentially processed by the processor comprises tests, each with associated developer-created test information that identifies conditional selection criteria for the tests based upon identified source files that are changed within the software build; and where, in being programmed to determine test coverage relative to a target risk level for the software build for each selected test, the processor is programmed to:

sum the test coverage risk reduction measure associated with the automated test coverage data for each test selected from the first of the plurality of test levels;

compare the summed test coverage risk reduction measure to the target risk level for the software build;

determine that the summed test coverage risk reduction measure does not at least meet the target risk level for the software build; and initiate selection of tests from the second of the plurality of test levels.

3. The system of claim 1, where:

the first of the plurality of test levels of the level-based testing suite sequentially processed by the processor comprises tests, each with the associated automated test coverage data; and a second of the plurality of test levels of the level-based testing suite sequentially processed by the processor comprises tests, each with associated developer-created test information that identifies conditional selection criteria for the tests based upon identified source files that are changed within the software build; and the processor is further programmed to:

determine that the test coverage relative to the target risk level for the software build for each selected test from the first of the plurality of test levels of the level-based testing suite sequentially processed does not at least meet the target risk level for the software build; and where, in being programmed to select tests that test the change to the at least one source file associated with the software build, the processor is programmed to select the tests from the second of the plurality of test levels based upon the associated developer-created test information; and where, in being programmed to determine test coverage relative to a target risk level for the software build for each selected test, the processor is programmed to determine whether the tests selected from the second of the plurality of test levels fully test the change to the at least one source file associated with the software build.

4. A system, comprising:

a memory that stores a level-based testing suite for testing a software build; and a processor programmed to:

receive an indication of a change to at least one source file associated with the software build;

sequentially process a plurality of test levels of the level-based testing suite, where each test level subsequently processed comprises tests with decreasing qualitative testing information relative to tests associated with previously-processed test levels;

for each processed test level, to:

select at least one test that tests the change to the at least one source file associated with the software build;

determine test coverage relative to a target risk level for the software build for each selected test;

determine a test coverage risk reduction measure associated with the automated test coverage data for each test selected from the first of the plurality of test levels of the level-based testing suite sequentially processed; and terminate test selection upon determining that the test coverage for the selected tests at least meets the target risk level for the software build; and upon termination of test selection, to:

configure a test for the software build to test the change to the at least one source file associated with the software build based upon the tests selected from a plurality of tests for each processed test level; and initiate testing of the software build via an automated testing framework.

5. A computer program product comprising a computer readable storage medium including a computer readable program, where the computer readable program when executed on a computer causes the computer to:

receive an indication of a change to at least one source file associated with the software build;

sequentially process a plurality of test levels of the level-based testing suite, where each test level subsequently processed comprises tests with decreasing qualitative testing information relative to tests associated with previously-processed test levels; and where the computer readable program when executed on the computer further causes the computer, for each processed test level, to:

select at least one test that tests the change to the at least one source file associated with the software build;

determine test coverage relative to a target risk level for the software build for each selected test;

determine a test coverage risk reduction measure associated with the automated test coverage data for each test selected from the first of the plurality of test levels of the level-based testing suite sequentially processed; and terminate test selection upon determining that the test coverage for the selected tests at least meets the target risk level for the software build.

6. The computer program product of claim 5, where:

the first of the plurality of test levels of the level-based testing suite sequentially processed by the computer comprises tests, each with the associated automated test coverage data;

a second of the plurality of test levels of the level-based testing suite sequentially processed by the computer comprises tests, each with associated developer-created test information that identifies conditional selection criteria for the tests based upon identified source files that are changed within the software build;

a third of the plurality of test levels of the level-based testing suite sequentially processed by the computer comprises tests, each with associated persistent source file test mapping information that identifies conditional selection criteria for the tests based upon identified components that comprise a plurality of source files that are changed within the software build; and a fourth of the plurality of test levels of the level-based testing suite sequentially processed by the computer comprises tests without qualitative testing information.

7. The computer program product of claim 6:
where, in causing the computer to determine test coverage relative to a target risk level for the software build for each selected test, the computer readable program when executed on the computer causes the computer to:
sum the test coverage risk reduction measure associated with the automated test coverage data for each test selected from the first of the plurality of test levels;
compare the summed test coverage risk reduction measure to the target risk level for the software build;
determine that the summed test coverage risk reduction measure does not at least meet the target risk level for the software build; and
initiate selection of tests from the second of the plurality of test levels.

8. The computer program product of claim 6, where the computer readable program when executed on the computer further causes the computer to:
determine that the test coverage relative to the target risk level for the software build for each selected test from the first of the plurality of test levels of the level-based testing suite sequentially processed does not at least meet the target risk level for the software build; and
where, in causing the computer to select tests that test the change to the at least one source file associated with the software build, the computer readable program when executed on the computer causes the computer to select the tests from the second of the plurality of test levels based upon the associated developer-created test information; and
where, in causing the computer to determine test coverage relative to a target risk level for the software build for each selected test, the computer readable program when executed on the computer causes the computer to determine whether the tests selected from the second of the plurality of test levels fully test the change to the at least one source file associated with the software build.

9. The computer program product of claim 6, where the computer readable program when executed on the computer further causes the computer to:
determine that the test coverage relative to the target risk level for the software build for each selected test from the first and second of the plurality of test levels of the level-based testing suite sequentially processed do not at least meet the target risk level for the software build; and
where, in causing the computer to select tests that test the change to the at least one source file associated with the software build, the computer readable program when executed on the computer causes the computer to select the tests from the third of the plurality of test levels based upon the associated persistent source file test mapping information; and
where, in causing the computer to determine test coverage relative to a target risk level for the software build for each selected test, the computer readable program when executed on the computer causes the computer to determine whether the tests selected from the third of the plurality of test levels fully test the change to the at least one source file associated with the software build.

10. The computer program product of claim 6, where the computer readable program when executed on the computer further causes the computer to:
determine that the test coverage relative to the target risk level for the software build for each selected test from the first, second, and third of the plurality of test levels of the level-based testing suite sequentially processed do not at least meet the target risk level for the software build; and
where, in causing the computer to select tests that test the change to the at least one source file associated with the software build, the computer readable program when executed on the computer causes the computer to select all tests from the fourth of the plurality of test levels of the level-based testing suite sequentially processed; and
where, in causing the computer to determine test coverage relative to a target risk level for the software build for each selected test, the computer readable program when executed on the computer causes the computer to determine whether the tests selected from the fourth of the plurality of test levels fully test the change to the at least one source file associated with the software build.

11. The computer program product of claim 5, where the computer readable program when executed on the computer further causes the computer to:
receive automated test coverage information for a test associated with a second of the plurality of test levels of the level-based testing suite sequentially processed; and
promote the test to the first of the plurality of test levels of the level-based testing suite sequentially processed.

12. The computer program product of claim 5, where the computer readable program when executed on the computer further causes the computer to:
receive a test for assignment to one of the plurality of test levels of the level-based testing suite;
determine whether the received test comprises available source file test configuration information; and
assign the received test to one of the plurality of test levels based upon the determination of whether the received test comprises the available source file test configuration information.

13. The computer program product of claim 12, where, in causing the computer to assign the received test to one of the plurality of test levels based upon the determination of whether the received test comprises the available source file test configuration information, the computer readable program when executed on the computer causes the computer to:
assign the received test to a first test level upon determining that the received test comprises automated test coverage information;
assign the received test to a second test level upon determining that the received test comprises developer-created test information;
assign the received test to a third test level upon determining that the received test comprises associated persistent source file test mapping information; and
assign the received test to a fourth test level upon determining that the received test does not comprise the available source file test configuration information.

* * * * *